(12) United States Patent
So et al.

(10) Patent No.: US 11,579,716 B2
(45) Date of Patent: Feb. 14, 2023

(54) ELECTRONIC DEVICE THAT PREVENTS MALFUNCTION IN ROLLED OR FOLDED AREA

(71) Applicant: Samsung Display Co., Ltd., Yongin-Si (KR)

(72) Inventors: Yongsub So, Suwon-si (KR); Sanghun Park, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/449,180

(22) Filed: Sep. 28, 2021

(65) Prior Publication Data

US 2022/0206609 A1 Jun. 30, 2022

(30) Foreign Application Priority Data

Dec. 30, 2020 (KR) .................. 10-2020-0187685

(51) Int. Cl.
*G06F 3/041* (2006.01)
*G09G 3/20* (2006.01)
*G06F 3/044* (2006.01)

(52) U.S. Cl.
CPC .......... *G06F 3/0412* (2013.01); *G06F 3/0446* (2019.05); *G06F 3/04184* (2019.05); *G09G 3/20* (2013.01); *G06F 2203/04102* (2013.01); *G09G 2380/02* (2013.01)

(58) Field of Classification Search
CPC .. G06F 3/0412; G06F 3/04184; G06F 3/0446; G06F 2203/04102; G09G 3/035; G09G 3/20; G09G 2380/02
See application file for complete search history.

(56) References Cited

U.S. PATENT DOCUMENTS

| | | | |
|---|---|---|---|
| 10,896,645 B2 | 1/2021 | Lee et al. | |
| 2014/0125639 A1* | 5/2014 | Cho | G09G 5/18 345/204 |
| 2015/0212644 A1* | 7/2015 | Noto | G06F 3/04164 345/174 |
| 2016/0313846 A1* | 10/2016 | Hong | G06F 3/0412 |
| 2020/0152109 A1 | 5/2020 | Jung et al. | |

FOREIGN PATENT DOCUMENTS

| | | |
|---|---|---|
| KR | 10-2017-0064888 | 6/2017 |
| KR | 10-2018-0039797 | 4/2018 |
| KR | 10-2020282 | 9/2019 |
| KR | 10-2020-0056090 | 5/2020 |

* cited by examiner

*Primary Examiner* — Liliana Cerullo
(74) *Attorney, Agent, or Firm* — F. Chau & Associates, LLC

(57) ABSTRACT

An electronic device including: a display layer including an active area and a peripheral area adjacent to the active area, wherein the active area includes a first area in which an image is displayed; a sensor layer disposed on the display layer and including a plurality of sensing electrodes; a controller configured to generate a change signal in response to a change in a surface area of the first area; a display driver configured to transmit a horizontal synchronization signal to the display layer in response to the change signal; and a sensing driver configured to control at least some of the plurality of sensing electrodes in response to the horizontal synchronization signal.

20 Claims, 15 Drawing Sheets

ELECTRONIC DEVICE THAT PREVENTS MALFUNCTION IN ROLLED OR FOLDED AREA

CROSS-REFERENCE TO RELATED APPLICATION

This U.S. non-provisional patent application claims priority under 35 U.S.C. § 119 to Korean Patent Application No. 10-2020-0187685, filed on Dec. 30, 2020, the disclosure of which is incorporated by reference herein in its entirety.

TECHNICAL FIELD

The present inventive concept relates to an electronic device capable of preventing a touch malfunction.

DISCUSSION OF RELATED ART

An electronic device, which provides an image to a user, such as a smartphone, a digital camera, a laptop computer, a navigation device, and a smart television, generally includes a display device for displaying an image. The display device is an output device for presentation of information in visual form. For example, the display device generates an image and provides the image to a user through a display screen. Various types of display devices are being developed due to technological advances. For example, various flexible display devices, which may be changed into a curved surface shape or may be folded or rolled, are under development. The flexible display devices are easy to carry and may improve user convenience.

SUMMARY

An embodiment of the inventive concept provides an electronic device including: a display layer including an active area and a peripheral area adjacent to the active area, wherein the active area includes a first area in which an image is displayed; a sensor layer disposed on the display layer and including a plurality of sensing electrodes; a controller configured to generate a change signal in response to a change in a surface area of the first area; a display driver configured to transmit a horizontal synchronization signal to the display layer in response to the change signal; and a sensing driver configured to control at least some of the plurality of sensing electrodes in response to the horizontal synchronization signal.

The active area may further include, due to a change of the display layer, a second area in which the image is not displayed, wherein the sensing driver drives sensing electrodes overlapping the first area among the plurality of sensing electrodes and does not drive sensing electrodes overlapping the second area among the plurality of sensing electrodes.

The change signal may include information about a first ratio of the first area to the active area and a second ratio of the second area to the active area.

The display driver may further transmit a vertical synchronization signal to the display layer, wherein the vertical synchronization signal may include a first period in which a signal of a low level is provided and a second period in which a signal of a high level is provided, and the horizontal synchronization signal may include a third period synchronized with the first period and a fourth period synchronized with the second period.

The third period may include a first partial period and a second partial period, the horizontal synchronization signal may include a first signal and a second signal, and the first signal may be provided in the first partial period, and the second signal may be provided in the second partial period.

The second partial period may occur subsequent to the first partial period.

The sensing driver may drive some of the plurality of sensing electrodes in response to the first signal and may not drive the rest of the plurality of sensing electrodes in response to the second signal.

A third ratio of the first partial period to the third period may be the same as the first ratio, and a fourth ratio of the second partial period to the third period may be the same as the second ratio.

The first signal may be provided on the basis of the first ratio, and the second signal may be provided on the basis of the second ratio.

The first signal may include a repeating square wave.

A first portion of the first signal may be provided in the first partial period, and a second portion of the first signal may be provided in the second partial period.

The first signal may include a signal of a first level that is provided once after a boundary between the third period and the fourth period and once after a boundary between the first partial period and the second partial period.

The display layer may be rollable, the first area may include an unrolled area, and the second area may include a rolled area.

The display layer may be foldable, the first area may include an area exposed to the outside, and the second area may include an area not exposed to the outside.

An embodiment of the inventive concept provides an electronic device including: a display layer including an active area, wherein the active area includes a first area in which an image is displayed; a sensor layer disposed on the display layer and including a plurality of sensing electrodes; a controller configured to detect a change in a surface area of the display layer and generate a change signal including information about the surface area of the first area; a display driver configured to generate a vertical synchronization signal and generate a horizontal synchronization signal in response to the change signal; and a sensing driver configured, in response to the horizontal synchronization signal, to drive sensing electrodes overlapping the first area among the plurality of sensing electrodes and not to drive the remaining sensing electrodes among the plurality of sensing electrodes.

The display layer may further include a second area in which the image is not displayed, and the information may include information about a first ratio of the first area to the active area and a second ratio of the second area to the active area.

The vertical synchronization signal may include a first period in which a signal of a low level is provided and a second period in which a signal of a high level is provided, and the horizontal synchronization signal may include a third period synchronized with the first period and a fourth period synchronized with the second period.

The third period may include a first partial period and a second partial period, and a first signal may be provided in the first partial period, and a second signal may be provided in the second partial period.

A ratio of the first partial period to the third period may be the same as the first ratio, and a ratio of the second partial period to the third period may be the same as the second ratio.

The first signal may be provided on the basis of the first ratio, and the second signal may be provided on the basis of the second ratio.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to describe the inventive concept. In the drawings.

DETAILED DESCRIPTION OF THE EMBODIMENTS

Figure 1A:
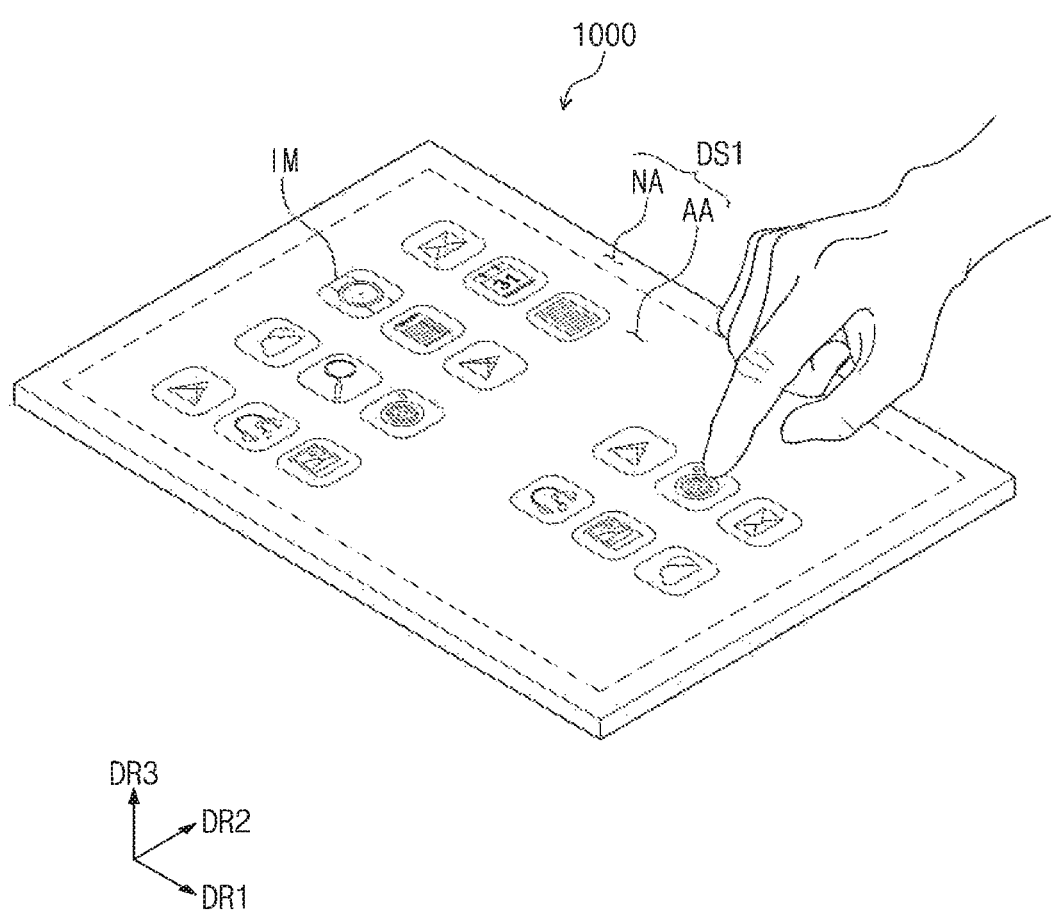
FIG. 1A is a perspective view of an electronic device according to an embodiment of the inventive concept.

It will be understood that when an element or layer is referred to as being "on", "connected to", or "coupled to" another element or layer, it can be directly on, connected, or coupled to the other element or layer, or intervening elements or layers may be present.

Like reference numerals may refer to like elements throughout this specification. In the figures, the thicknesses, ratios, and dimensions of elements may be exaggerated for effective description of the technical contents.

As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section. As used herein, the singular forms, "a", "an", and "the" are intended to include the plural forms as well, unless the context clearly indicates otherwise.

Spatially relative terms, such as "beneath", "below", "lower", "above", and "upper", may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "include" or "have", when used in this specification, specify the presence of stated features, integers, steps, operations, elements, and/or components, but do not preclude the presence or addition of one or more other features, integers, steps, operations, elements, components, and/or groups thereof.

Hereinafter, the present inventive concept will be explained in detail with reference to the accompanying drawings.

Figure 1B:
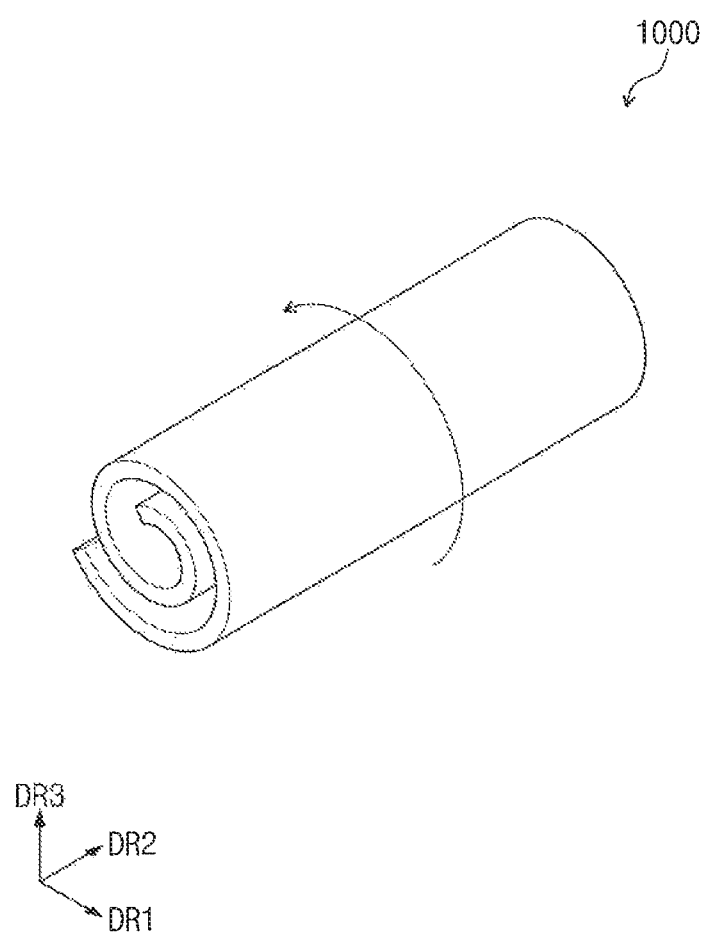
FIG. 1B illustrates a rolled state of an electronic device according to an embodiment of the inventive concept.

FIG. 1A is a perspective view of an electronic device according to an embodiment of the inventive concept, and FIG. 1B illustrates a rolled state of an electronic device according to an embodiment of the inventive concept.

Referring to FIG. 1A and FIG. 1B, an electronic device 1000 may have a shape extending in a first direction DR1 and a second direction DR2 crossing the first direction DR1. A normal direction of the electronic device 1000, in other words, a thickness direction of the electronic device 1000 is indicated by a third direction DR3. In this specification, the phrase "when viewed in a plane", "on a plane", or "a surface area when viewed in a plane" may refer to a case of viewing in the third direction DR3. A front surface (or a top surface) and a rear surface (or a bottom surface) of each of layers or units to be described below are distinguished on the basis of the third direction DR3. However, directions indicated by the first to third directions DR1 to DR3 are relative and may be convened into different directions, for example, opposite directions.

A top surface of the electronic device 1000 may be a display surface DS1. The display surface DS1 may have a plane defined by the first direction DR1 and the second direction DR2. An image IM generated in the electronic device 1000 may be provided to users through the display surface DS1. As an example of the image IM, a clock display window and application icons are illustrated.

The display surface DS1 may include an active area AA and a peripheral area NA adjacent to the active area AA. The active area AA may be an area operated by an electrical signal. The peripheral area NA may surround the active area AA and form a border of the electronic device 1000 printed in a predetermined color. However, this is an example, and the peripheral area NA according to an embodiment of the inventive concept may be adjacent to only a portion of the active area AA or omitted.

The electronic device 1000 may include large-sized electronic devices such as a television, a monitor, and an outdoor digital signage. In addition, the electronic device 1000 may include medium- and small-sized electronic devices such as a personal computer, a laptop computer, a personal digital assistant, a car navigation device, a game machine, a smartphone, a tablet, and a camera. However, these are examples, and the electronic device 1000 may include a variety of other electronic devices.

The electronic device 1000 may be a flexible electronic device that may be rolled. For example, the electronic device 1000 may be a rollable electronic device.

The electronic device 1000 may be rolled in the first direction DR1. The electronic device 1000 may be rolled in a circular shape. A user may carry the electronic device 1000 in a rolled state and may unroll as needed the electronic device 1000 to view an image. In this case, the portability of the electronic device 1000 may be enhanced.

Figure 2A:
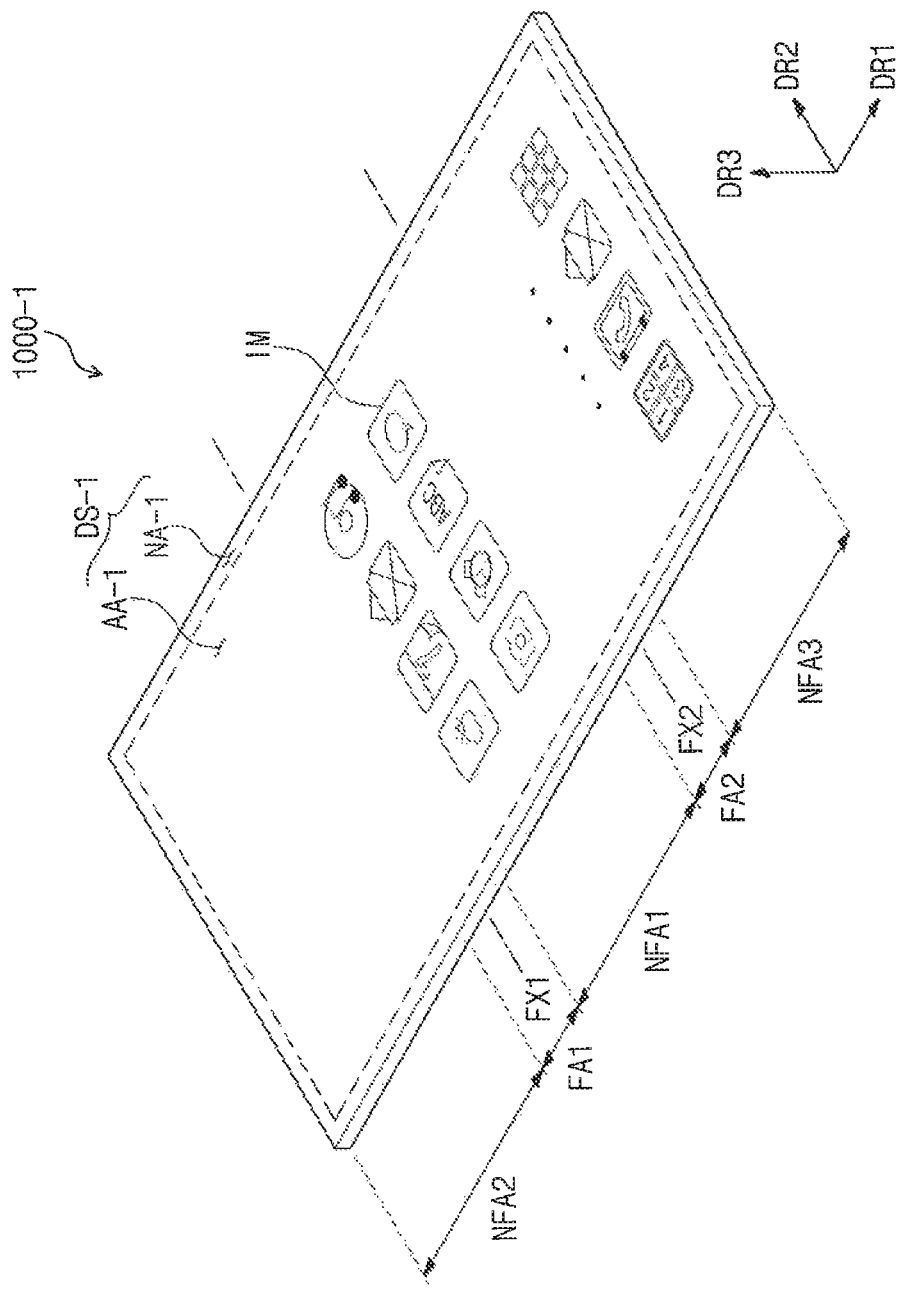
FIG. 2A is a perspective view of an electronic device according to an embodiment of the inventive concept.
Figure 2B:
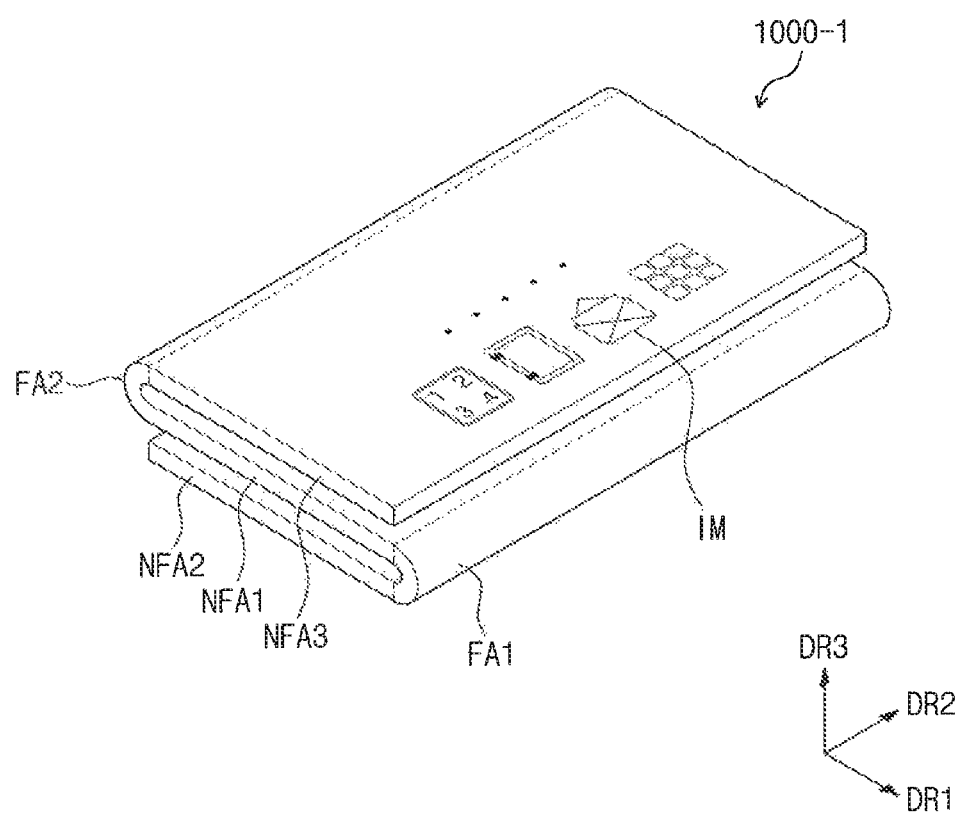
FIG. 2B illustrates a folded state of an electronic device according to an embodiment of the inventive concept.

FIG. 2A is a perspective view of an electronic device according to an embodiment of the inventive concept, and FIG. 2B illustrates a folded state of an electronic device according to an embodiment of the inventive concept.

Referring to FIG. 2A and FIG. 2B, an electronic device 1000-1 may display an image IM through a display surface DS-1. The display surface DS-1 may include an active area AA-1 and a peripheral area NA-1 adjacent to the active area AA-1. The active area AA-1 may be an area that is operated by an electrical signal. The peripheral area NA-1 may surround the active area AA-1 and form a border of the electronic device 1000-1 printed in a predetermined color. However, the peripheral area NA-1 is not limited thereto, but may be adjacent to only a portion of the active area AA-1 or omitted.

According to an embodiment of the inventive concept, the electronic device 1000-1 may include a flexible material and may be folded about a folding axis. For example, the electronic device 1000-1 may include a first flat portion NFA1, a second flat portion NFA2, a third flat portion NFA3, a first folding portion FA1, and a second folding portion FA2. The first flat portion NFA1 may be disposed between the second flat portion NFA2 and the third flat portion NFA3. The first folding portion FA1 may be disposed between the first flat portion NFA1 and the second flat portion NFA2, and the second folding portion FA2 may be disposed between the first flat portion NFA1 and the third flat portion NFA3.

Each of the first flat portion NFA1, the second flat portion NFA2, and the third flat portion NFA3 may have a flat shape and may not be folded. The first folding portion FA1 may be folded about a first folding axis FX1. The second folding portion FA2 may be folded about a second folding axis FX2. Each of the first folding axis FX1 and the second folding axis FX2 may extend in a direction the same as the second direction DR2.

In an embodiment of the inventive concept, the second folding portion FA2 may be folded after the first folding portion FA1 is folded. In addition, the first folding portion FA1 may be folded after the second folding portion FA2 is folded. In other words, the electronic device 1000 according to an embodiment of the inventive concept may be folded through any one of the first folding portion FA1 and the second folding portion FA2 regardless of the order.

In a folded state, the first folding portion FA1 may have a first radius of curvature. The second folding portion FA2 may have a second radius of curvature. The first radius of curvature and the second radius of curvature may be the same. As the first folding portion FA1 is folded, the first flat portion NFA1 and the second flat portion NFA2 may face each other. The first flat portion NFA1 and the second flat portion NFA2 may not be exposed to the outside. As the second folding portion FA2 is folded, the third flat portion NFA3 may be exposed to the outside. The image IM may be displayed on the third flat portion NFA3.

Figure 3:
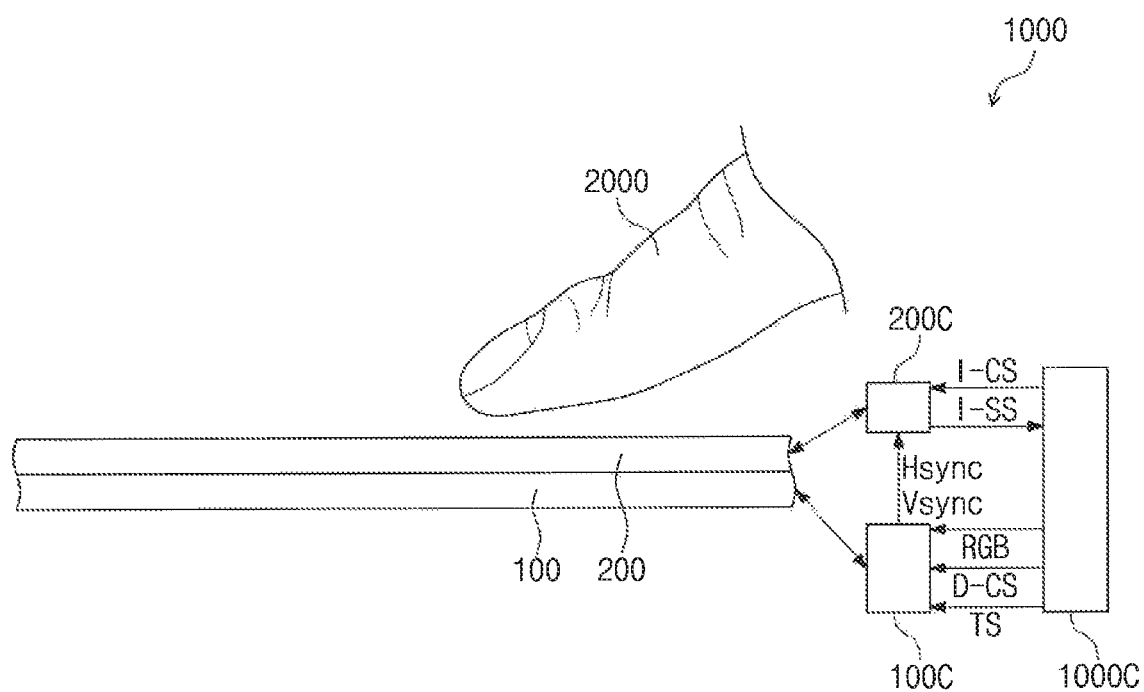
FIG. 3 is a schematic block diagram of an electronic device according to an embodiment of the inventive concept.

FIG. 3 is a schematic block diagram of an electronic device according to an embodiment of the inventive concept.

Referring to FIG. 3, the electronic device 1000 may include a display layer 100, a sensor layer 200, a display driver 100C, a sensing driver 200C, and a controller 1000C.

The display layer 100 may be a component that generates an image including the image IM (see FIG. 1A). The display layer 100 may be a light emitting display layer and may be, for example, an organic light emitting display layer, a quantum dot display layer, a micro light emitting diode (LED) display layer, or a nano LED display layer.

The sensor layer 200 may be disposed on the display layer 100. The sensor layer 200 may sense an external input 2000 (e.g., a user's body) applied from the outside. The sensor layer 200 may sense an input by the user's body 2000.

The controller 1000C may control the overall operation of the electronic device 1000 or detect a change of the electronic device 1000. For example, the controller 1000C may control operations of the display driver 100C and the sensing driver 200C. The controller 1000C may include at least one microprocessor and may be referred to as a host.

The display driver 100C may control the display layer 100. The controller 1000C may further include a graphic controller. The display driver 100C may receive a change signal TS, image data RGB, and a control signal D-CS from the controller 1000C.

The change signal TS may be generated by detecting a change of the display layer 100. The controller 1000C may generate the change signal TS by detecting a rolled state of the rollable display layer 100 of the rollable electronic device 1000 (see FIG. 1B). For example, the change signal TS may include information about an unrolled area and a rolled area. In addition, the controller 1000C may generate a change signal TS by detecting a folded state of a foldable display layer 100-1 of the foldable electronic device 1000-1 (see FIG. 2B). For example, the change signal TS may include information about an area exposed to the outside and an area not exposed to the outside. For example, the change signal TS may indicate that the first flat portion NFA1 is not exposed to the outside and the third flat portion NFA3 is exposed to the outside.

The control signal D-CS may include various signals. For example, the control signal D-CS may include an input vertical synchronization signal, an input horizontal synchronization signal, a main clock, a data enable signal, and the like. The display driver 100C may generate, on the basis of the control signal D-CS and the change signal TS, a vertical synchronization signal Vsync and a horizontal synchronization signal Hsync for controlling timing of providing a signal to the display layer 100. The vertical synchronization signal Vsync and the horizontal synchronization signal Hsync will be described later.

The display driver 100C may provide the sensing driver 200C with the vertical synchronization signal Vsync and the horizontal synchronization signal Hsync.

The sensing driver 200C may control the sensor layer 200. The sensing driver 200C may receive a control signal I-CS from the controller 1000C. The control signal I-CS may include a clock signal. The sensing driver 200C may calculate coordinate information of an external input (e.g., a user's input) on the basis of a signal received from the sensor layer 200 and may provide the controller 1000C with a coordinate signal 1-SS including the coordinate information.

The controller 1000C may allow, on the basis of the coordinate signal I-SS, an operation corresponding to the user's input to be executed. For example, the controller 1000C may operate, on the basis of the coordinate signal I-SS, the display driver 100C so that a new application image is displayed on the display layer 100.

Figure 4A:
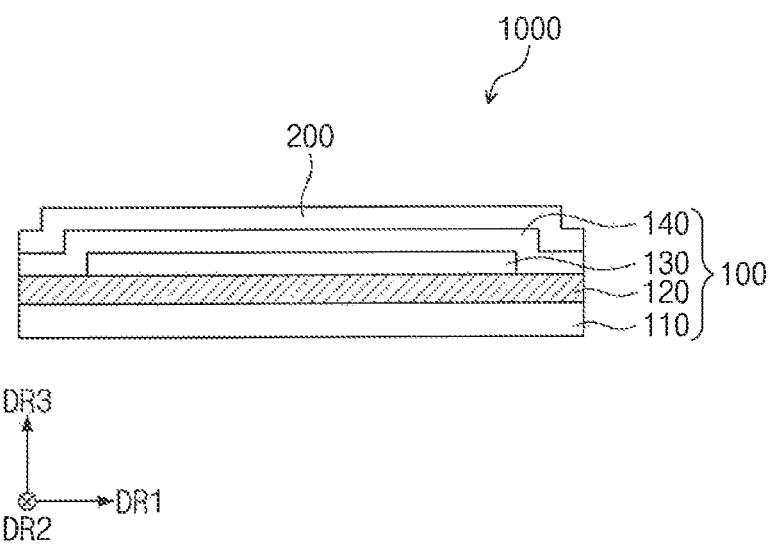
FIG. 4A and FIG. 4B are cross-sectional views of electronic devices according to embodiments of the inventive concept.

FIG. 4A is a cross-sectional view of an electronic device according to an embodiment of the inventive concept.

Referring to FIG. 4A, the electronic device 1000 may include the display layer 100 and the sensor layer 200. The display layer 100 may include a base layer 110, a circuit layer 120, a light emitting element layer 130, and an encapsulation layer 140.

The base layer 110 may be a member providing a base surface on which the circuit layer 120 is disposed. The base layer 110 may be a glass substrate, a metal substrate, or a polymer substrate. However, an embodiment of the inventive concept is not limited thereto, and the base layer 110 may be an inorganic layer, an organic layer, or a composite material layer.

The base layer 110 may have a multilayer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include polyimide-based resin. In addition, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin. In this specification, "~~"-based resin may mean that the "~~"-based resin includes a functional group of "~~".

The circuit layer 120 may be disposed on the base layer 110. The circuit layer 120 may include an insulating layer, a semiconductor pattern, a conductive pattern, a signal line, and the like. The insulating layer, a semiconductor layer, and a conductive layer may be formed on the base layer 110 in a method such as coating and deposition, and thereafter, the insulating layer, the semiconductor layer, and the conductive layer may be selectively patterned through multiple times of photolithography processes. Thereafter, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro LED, or a nano LED.

The encapsulation layer 140 may be disposed on the light emitting element layer 130. The encapsulation layer 140 may protect the light emitting element layer 130 from foreign matter such as moisture, oxygen, and dust particles.

The sensor layer 200 may be formed on the display layer 100 through a continuous process. In this case, the sensor layer 200 may be said to be directly disposed on the display layer 100. For example, the sensor layer 200 may be directly disposed on the encapsulation layer 140. The phrase "directly disposed" may mean that a third component is not disposed between the sensor layer 200 and the display layer 100. In other words, a separate adhesive member may not be disposed between the sensor layer 200 and the display layer 100. Alternatively, the sensor layer 200 may be bonded to the display layer 100 by an adhesive member. The adhesive member may include an adhesive or a detachable adhesive.

Figure 4B:
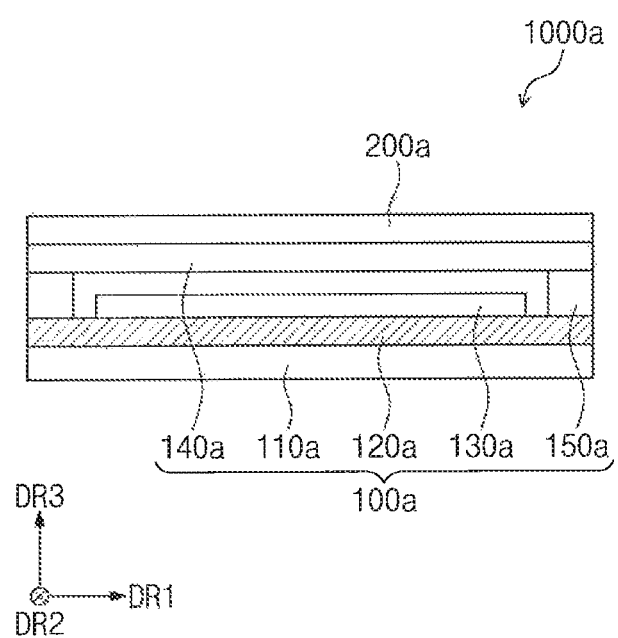

FIG. 4B is a cross-sectional view of an electronic device according to an embodiment of the inventive concept. When a description is given about FIG. 4B, and a component already described with reference to FIG. 4A is denoted by the same or similar reference numeral, a description thereof may not be given.

Referring to FIG. 4B, an electronic device 1000a may include a display layer 100a and a sensor layer 200a. The display layer 100a may include a base substrate 110a, a circuit layer 120a, a light emitting element layer 130a, an encapsulation substrate 140a, and a bonding member 150a.

Each of the base substrate 110a and the encapsulation substrate 140a may be a glass substrate, a metal substrate, or a polymer substrate but is not particularly limited thereto.

The bonding member 150a may be disposed between the base substrate 110a and the encapsulation substrate 140a. For example, the bonding member 150a may be in direct contact with the base substrate 110a and the encapsulation substrate 140a. The bonding member 150a may bond the encapsulation substrate 140a to the base substrate 110a or the circuit layer 120a. The bonding member 150a may include an inorganic material or an organic material. For example, the inorganic material may include a frit seal, and the organic material may include photocurable resin or photoplastic resin. However, a material constituting the bonding member 150a is not limited to the above example.

The sensor layer 200a may be directly disposed on the encapsulation substrate 140a. The phrase "directly disposed" may mean that a third component is not disposed between the sensor layer 200a and the encapsulation substrate 140a. In other words, a separate adhesive member may not be disposed between the sensor layer 200a and the display layer 100a. However, an embodiment of the inventive concept is not limited thereto, and an adhesive layer may be further disposed between the sensor layer 200a and the encapsulation substrate 140a.

Figure 5:
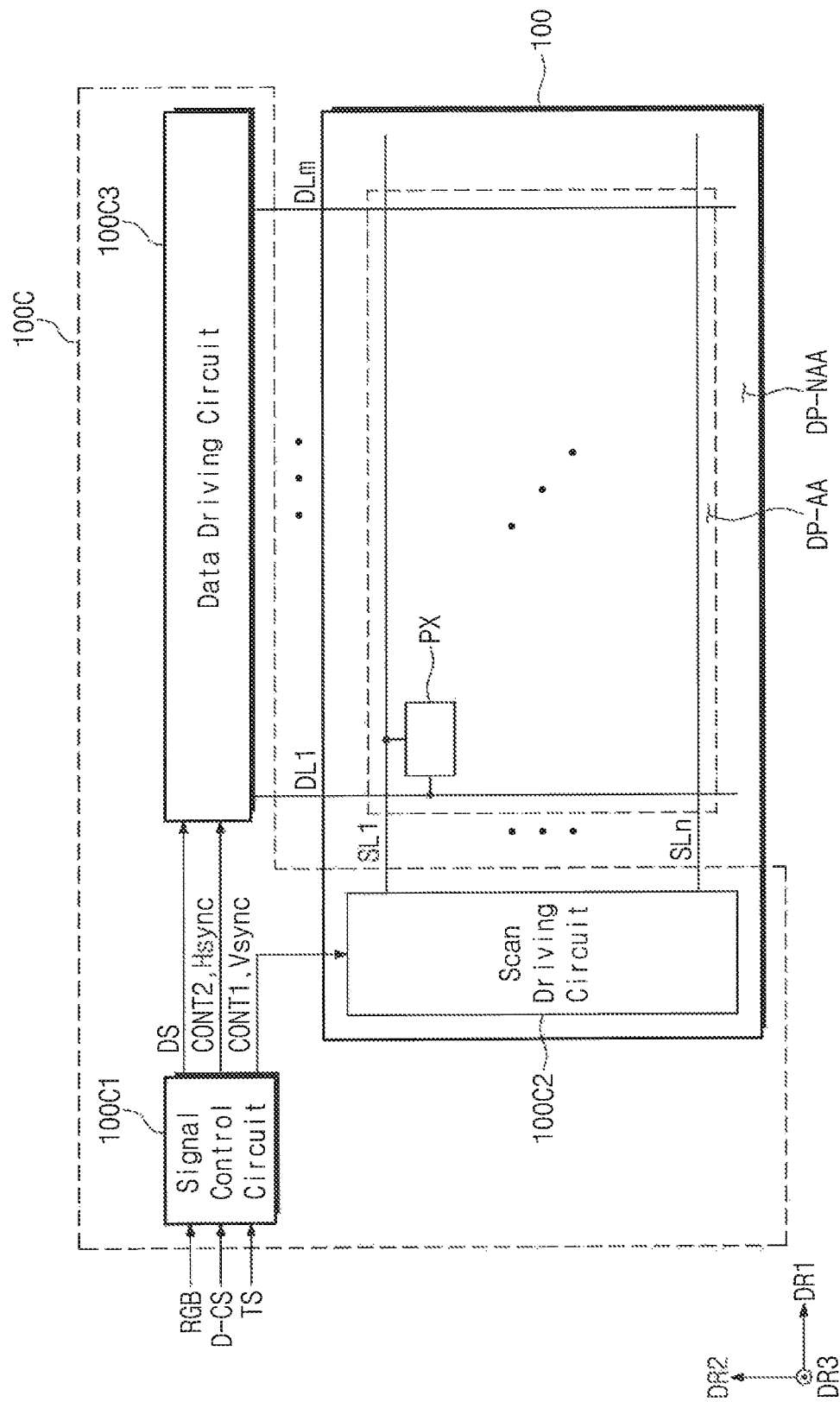
FIG. 5 is a block diagram of a display layer and a display driver according to an embodiment of the inventive concept.

FIG. 5 is a block diagram of a display layer and a display driver according to an embodiment of the inventive concept.

Referring to FIG. 5, an active area DP-AA and a peripheral area DP-NAA surrounding the active area DP-AA may be provided in the display layer 100. The active area DP-AA may be an area that is activated according to an electrical signal. The active area DP-AA may overlap the active area AA (see FIG. 1A) of the electronic device 1000 (see FIG. 1A), and the peripheral area DP-NAA may overlap the peripheral area NA (see FIG. 1A) of the electronic device 1000 (see FIG. 1A).

The display layer 100 may include a plurality of scan lines SL1 to SLn, a plurality of data lines DL1 to DLm, and a plurality of pixels PX. Each of the plurality of pixels PX may be connected to a corresponding data line among the plurality of data lines DL1 to DLm and connected to a corresponding scan line among the plurality of scan lines SL1 to SLn. In an embodiment of the inventive concept, the display layer 100 may further include light emission control lines, and the display driver 100C may further include a light emission driving circuit that provides control signals to the light emission control lines. The configuration of the display layer 100 is not particularly limited.

The display driver 100C may include a signal control circuit 100C1, a scan driving circuit 100C2, and a data driving circuit 100C3.

The signal control circuit 100C1 may receive the change signal TS, the image data RGB, and the control signal D-CS from the controller 1000C (see FIG. 3).

The signal control circuit 100C1 may generate a first control signal CONT1 on the basis of the control signal D-CS and generate the vertical synchronization signal Vsync on the basis of the control signal D-CS and the change signal TS. The signal control circuit 100C1 may output the first control signal CONT1 and the vertical synchronization signal Vsync to the scan driving circuit 100C2. The vertical synchronization signal Vsync may also be included in the first control signal CONT1.

The signal control circuit 100C1 may generate a second control signal CONT2 on the basis of the control signal D-CS and generate the horizontal synchronization signal Hsync on the basis of the control signal D-CS and the change signal TS. The signal control circuit 100C1 may output the second control signal CONT2 and the horizontal synchronization signal Hsync to the data driving circuit 100C3. The horizontal synchronization signal Hsync may also be included in the second control signal CONT2.

In addition, the signal control circuit 100C1 may output, to the data driving circuit 100C3, a data signal DS obtained by processing the image data RGB according to an operating condition of the display layer 100. The first control signal CONT1 and the second control signal CONT2 are signals required for operations of the scan driving circuit 100C2 and the data driving circuit 100C3, respectively, and are not particularly limited.

The scan driving circuit 100C2 may drive the plurality of scan lines SL1 to SLn in response to the first control signal CONT1 and the vertical synchronization signal Vsync. In an embodiment of the inventive concept, the scan driving circuit 100C2 may be formed in the same process as the circuit layer 120 (see FIG. 4A) in the display layer 100, but the scan driving circuit 100C2 is not limited thereto. For example, the scan driving circuit 100C2 may be implemented as an integrated circuit (IC) to be directly mounted on a predetermined area of the display layer 100, or may be mounted on a separate printed circuit board in a chip on film (COF) method to be electrically connected to the display layer 100.

The data driving circuit 100C3 may output gradation voltages for driving the plurality of data lines DL1 to DLm in response to the second control signal CONT2, the horizontal synchronization signal Hsync, and the data signal DS from the signal control circuit 100C1. The data driving circuit 100C3 may be implemented as an integrated circuit to be directly mounted on a predetermined area of the display layer 100 or may be mounted on a separate printed circuit board in a chip on film method to be electrically connected to the display layer 100, but the data driving circuit 100C3 is not particularly limited. For example, the data driving circuit 100C3 may be formed in the same process as the circuit layer 120 (see FIG. 4A) in the display layer 100.

Figure 6A:
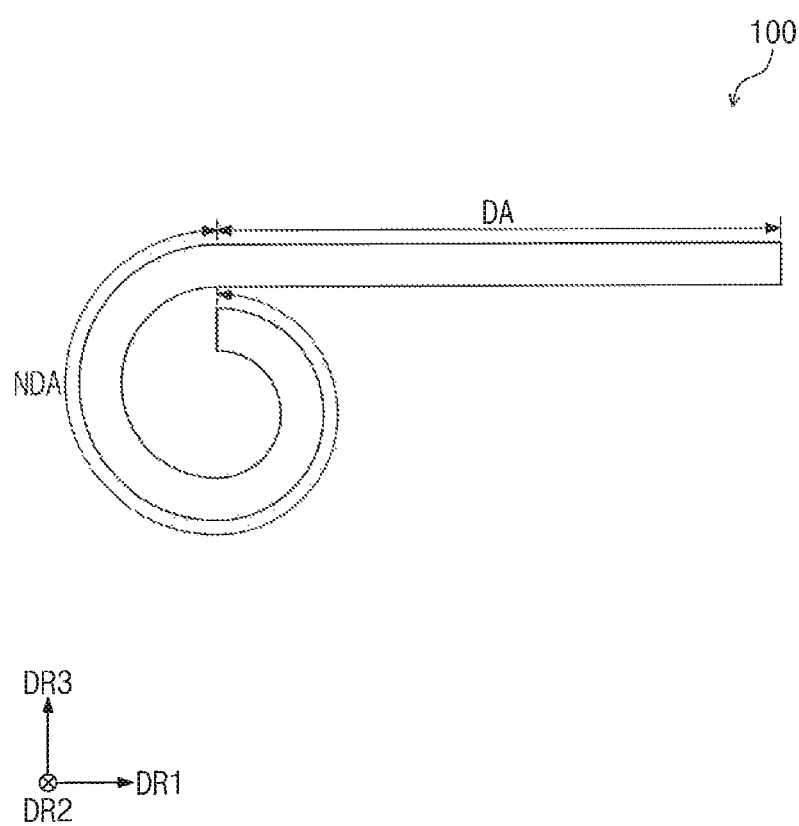
FIG. 6A illustrates a display layer according to an embodiment of the inventive concept.
Figure 6B:
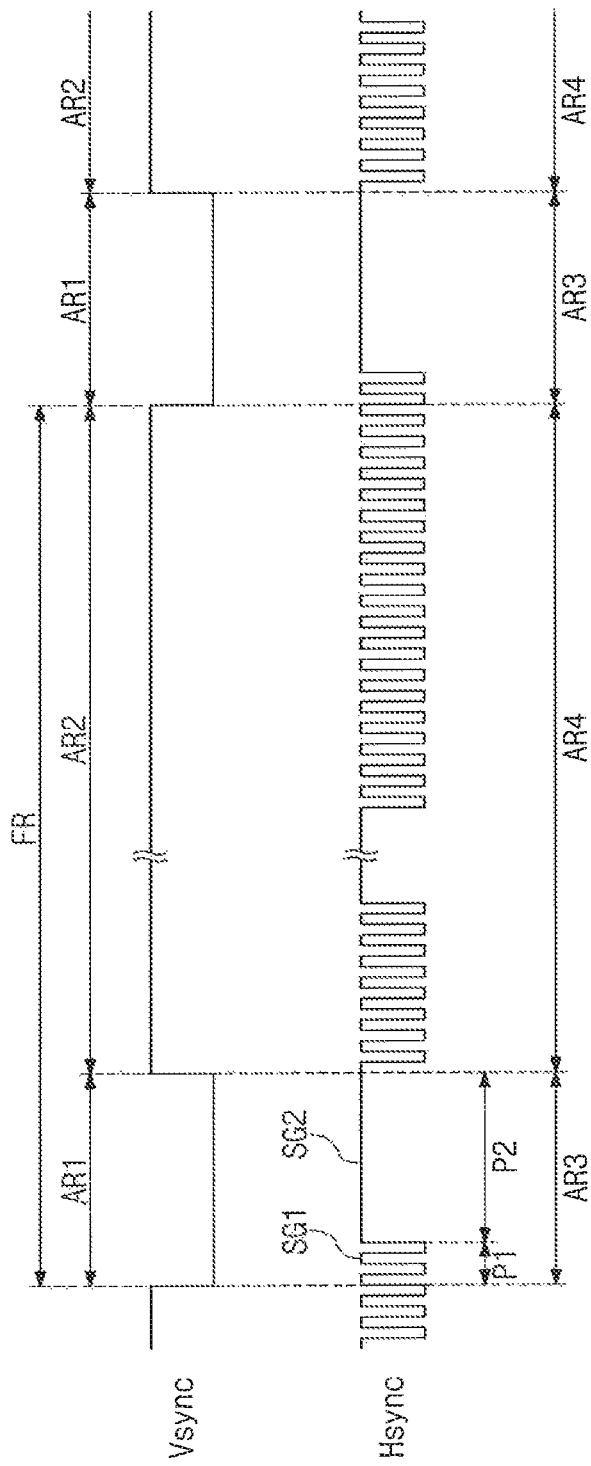
FIG. 6B illustrates a vertical synchronization signal and a horizontal synchronization signal according to an embodiment of the inventive concept.

FIG. 6A illustrates a display layer according to an embodiment of the inventive concept, and FIG. 6B illustrates a vertical synchronization signal and a horizontal synchronization signal according to an embodiment of the inventive concept.

Referring to FIGS. 3, 5, 6A, and 6B, the display layer 100 may be rollable. The active area DP-AA of the display layer 100 may include a first area DA and a second area NDA. The first area DA may include an unrolled area. The first area DA may display an image including the image IM (see FIG. 1A). The second area NDA may include a rolled area. The second area NDA may not display the image. It is to be understood, however, that in some cases the second area NDA may display the image.

The controller 1000C may generate the change signal TS by detecting a change of the first area DA and the second area NDA. For example, the change signal TS may be detected in response to the rolling or folding of the display layer 100. The controller 1000C may transmit the change signal TS to the display driver 100C. The change signal TS may include information about a first ratio of the first area DA to the active area DP-AA of the display layer 100 and a second ratio of the second area NDA to the active area DP-AA of the display layer 100. For example, the first ratio may be about 80%, and the second ratio may be about 20%. However, this is an example, and the first ratio and the second ratio according to an embodiment of the inventive concept may vary according to the degree of being rolled of the display layer 100.

The display driver 100C may transmit, to the display layer 100, the vertical synchronization signal Vsync and the horizontal synchronization signal Hsync generated on the basis of the change signal TS.

The display layer 100 may display an image for each of frame periods FR. The frame period FR may be a period from a falling edge of the vertical synchronization signal Vsync to a next falling edge of the vertical synchronization signal Vsync. However, this is an example, and the frame period FR according to an embodiment of the inventive concept is not limited thereto. For example, the frame period FR may be a period from a rising edge of the vertical synchronization signal Vsync to a next rising edge of the vertical synchronization signal Vsync.

When an operating frequency of the display layer 100 is about 60 Hz (Hertz), time corresponding to the frame period FR may be about 16.44 ms (milliseconds), and when the operating frequency of the display layer 100 is about 120 Hz, time corresponding to the frame period FR may be about 8.33 ms.

In the frame period FR, the vertical synchronization signal Vsync may include a first period AR1 in which a signal of a low level is provided and a second period AR2 in which a signal of a high level is provided. In other words, the vertical synchronization signal Vsync may be low in the first period AR1 and high in the second period AR2. The horizontal synchronization signal Hsync may include a third period AR3 synchronized with the first period AR1 and a fourth period AR4 synchronized with the second period AR2. In other words, the third period AR3 may overlap the first period AR1 and the fourth period AR4 may overlap the second period AR2.

The vertical synchronization signal Vsync may define the frame period FR of the display layer 100. In other words, a period of pulses of the vertical synchronization signal Vsync may be set to a length of time of the frame period FR. A frequency corresponding to the period set to the length of time of the frame period FR as described above may be referred to as a display frame rate.

The horizontal synchronization signal Hsync may be a horizontal time required to write data to pixels in one line of the display layer 100. In other words, a period of pulses of the horizontal synchronization signal Hsync may be set to the horizontal time.

A display time may be a period having a length of time obtained by multiplying the number of lines of the pixels PX of the display layer 100 by the horizontal time. In other words, the display time may be a period having a length of time required to write data to all lines of the display layer 100. For example, the display time may include the second period AR2 and the fourth period AR4.

A display porch time may be set to a period obtained by excluding the display time from the frame period FR. In other words, the display porch time may be a period in which data is not written to each line of the display layer 100. For example, the display porch time may include the first period AR1 and the third period AR3. In other words, data is not written to the display layer 100 at the beginning of the frame period FR.

The third period AR3 may include a first partial period P1 and a second partial period P2 which depend on the change signal TS. The first partial period P1 and the second partial period P2 may be first and second sub-periods of the third period AR3, respectively. The second partial period P2 may occur subsequent to the first partial period P1. A third ratio of the first partial period P1 to the third period AR3 may be the same as the first ratio of the first area DA to the active area DP-AA. A fourth ratio of the second partial period P2 to the third period AR3 may be the same as the second ratio of the second area NDA to the active area DP-AA. For example, the third ratio may be about 80%, and the fourth ratio may be about 20%.

The horizontal synchronization signal Hsync may include a first signal SG1 and a second signal SG2. The first signal SG1 may be provided in the first partial period P1. The first signal SG1 may be provided on the basis of the second area NDA. The first signal SG1 may include a signal having a shape of a repeating square wave. The second signal SG2 may be provided in the second partial period P2. The second signal SG2 may be provided on the basis of the first area DA. The second signal SG2 may include a signal of a high level. In other words, the first signal SG1 may correspond to the second area NDA and the second signal SG2 may correspond to the first area DA.

The display driver 100C may provide the vertical synchronization signal Vsync and the horizontal synchronization signal Hsync to the sensing driver 200C. The sensing driver 200C may separate the first area DA from the second area NDA on the basis of the vertical synchronization signal Vsync and the horizontal synchronization signal Hsync. For example, the sensing driver 200C may identify, on the basis of the second signal SG2 of the high level, the first area DA in which an image is displayed, and may identify, on the basis of the first signal SG1 having the shape of the repeating square wave, the second area NDA in which no image is displayed. In other words, the first and second signals SG1 and SG2 may identify an image display area and a non-image display area of the display layer 100. The sensing driver 200C may control the sensor layer 200 on the basis of the vertical synchronization signal Vsync and the horizontal synchronization signal Hsync. A description thereof will be given later.

Figure 7A:
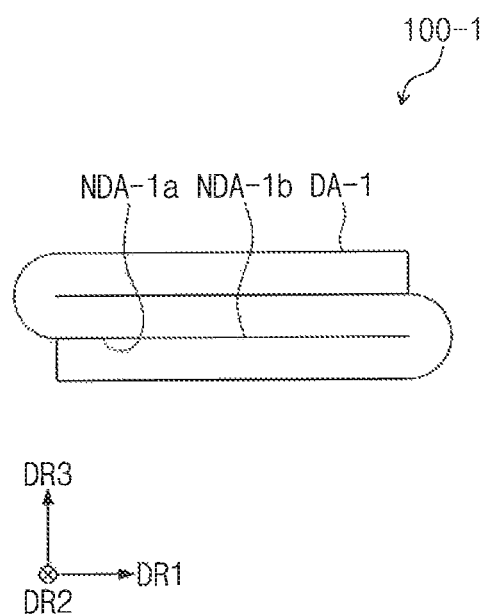
FIG. 7A illustrates a display layer according to an embodiment of the inventive concept.
Figure 7B:
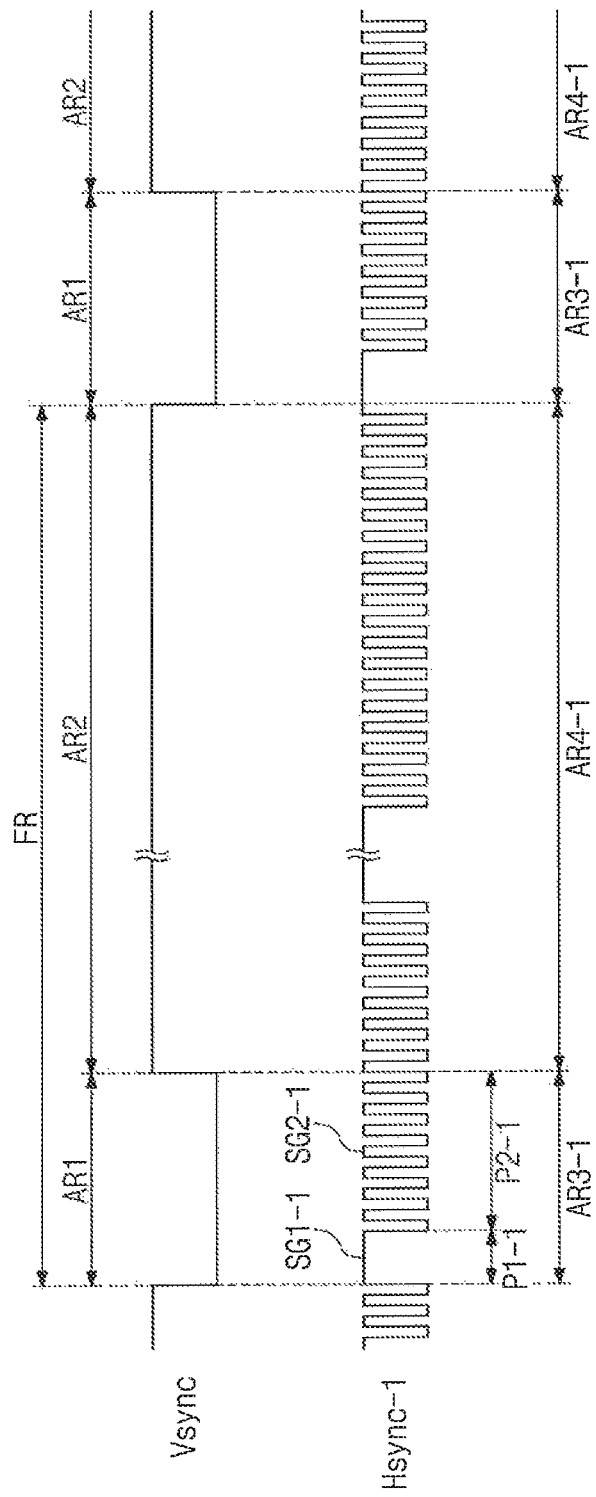
FIG. 7B illustrates a vertical synchronization signal and a horizontal synchronization signal according to an embodiment of the inventive concept.

FIG. 7A illustrates a display layer according to an embodiment of the inventive concept, and FIG. 7B illustrates a vertical synchronization signal and a horizontal synchronization signal according to an embodiment of the inventive concept. When a description is given about FIG. 7B, and a component already described with reference to FIG. 6B is denoted by the same or similar reference numeral, a description thereof may not be given.

Referring to FIGS. 3, 7A, and 7B, the display layer 100-1 may be foldable. An active area may be provided in the display layer 100-1. The active area of the display layer 100-1 may overlap the active area AA-1 (see FIG. 2A) of the electronic device 1000-1 (see FIG. 2A).

The active area of the display layer 100-1 may include a first area DA-1 and a plurality of second areas NDA-1a and NDA-1b. The first area DA-1 may include an area exposed to the outside. The first area DA-1 may overlap the third flat portion NFA3 (see FIG. 2B). The first area DA-1 may display an image including the image IM (see FIG. 2A). Each of the plurality of second areas NDA-1a and NDA-1b may include an area not exposed to the outside. The plurality of second areas NDA-1a and NDA-1b may not display the image. However, in some cases, the plurality of second areas NDA-1a and NDA-1b may display the image. The plurality of second areas NDA-1a and NDA-1b may include a first non-display area NDA-1a and a second non-display area NDA-1b. The first non-display area NDA-1a may overlap the first flat portion NFA1 (see FIG. 2B). The second non-display area NDA-1b may overlap the second flat portion NFA2 (see FIG. 2B). The plurality of second areas NDA-1a and NDA-1b may face each other.

The controller 1000C may generate the change signal TS by detecting a change in a surface area of each of the first area DA-1 and the plurality of second areas NDA-1a and NDA-1b. The controller 1000C may transmit the change signal IS to the display driver 100C. The change signal TS may include information about a first ratio of the first area DA-1 to the active area of the display layer 100-1 and a second ratio of the plurality of second areas NDA-1a and NDA-1b to the active area. For example, the first ratio may be about ⅓, and the second ratio may be about ⅔. However, this is an example, and the first ratio and the second ratio according to an embodiment of the inventive concept may vary according to a folded state of the display layer 100-1. For example, the first ratio may be ¼, and the second ratio may be ¾.

The display driver 100C may transmit, to the display layer 100-1, a vertical synchronization signal Vsync and a horizontal synchronization signal Hsync-1 generated on the basis of the change signal TS.

The horizontal synchronization signal Hsync-1 may include a third period AR3-1 synchronized with a first period AR1 of the vertical synchronization signal Vsync and a fourth period AR4-1 synchronized with a second period AR2 of the vertical synchronization signal Vsync.

The third period AR3-1 may include a first partial period P1-1 and a second partial period P2-1 which depend on the change signal TS. For example, the first partial period P1-1 may correspond to a first state of the change signal TS and the second partial period P2-1 may correspond to a second state of the change signal TS. A third ratio of the first partial period P1-1 to the third period AR3-1 may be the same as the first ratio of the first area DA-1 to the active area. A fourth ratio of the second partial period P2-1 to the third period AR3-1 may be the same as the second ratio of the plurality of second areas NDA-1a and NDA-1b to the active area. For example, the third ratio may be about ⅓, and the fourth ratio may be about ⅔.

The horizontal synchronization signal Hsync-1 may include a first signal SG1-1 and a second signal SG2-1. The first signal SG1-1 may be provided in the first partial period P1-1. The first signal SG1-1 may be provided on the basis of the first area DA-1. In other words, the first signal SG1-1 may identify the first area DA-1. The first signal SG1-1 may include a signal of a high level. The second signal SG2-1 may be provided in the second partial period P2-1. The second signal SG2-1 may be provided on the basis of the plurality of second areas NDA-la and NDA-1b. In other words, the second signal SG2-1 may identify the plurality of second areas NDA-1a and NDA-1b. The second signal SG2-1 may include a signal having a shape of a repeating square wave.

The display driver 100C may provide the vertical synchronization signal Vsync and the horizontal synchronization signal Hsync-1 to the sensing driver 200C. The sensing driver 200C may separate the first area DA-1 from the plurality of second areas NDA-1a and NDA-1b on the basis of the vertical synchronization signal Vsync and the horizontal synchronization signal Hsync-1. For example, the sensing driver 200C may identify, on the basis of the first signal SG1-1 of the high level, the first area DA-1 in which an image is displayed, and may identify, on the basis of the second signal SG2-1 having the shape of the repeating square wave, the plurality of second areas NDA-1a and NDA-1b in which an image is not displayed. The sensing driver 200C may control the sensor layer 200 on the basis of the vertical synchronization signal Vsync and the horizontal synchronization signal Hsync-1. A description thereof will be given later.

Figure 8A:
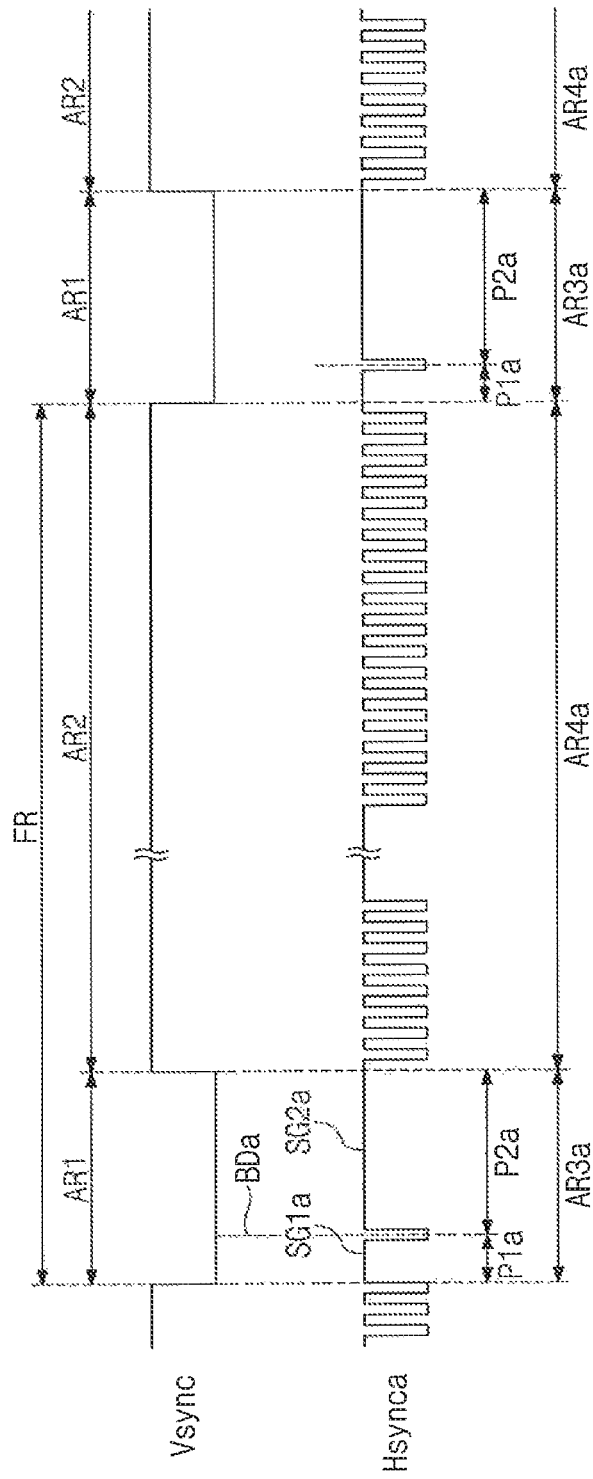
FIG. 8A and FIG. 8B illustrate vertical synchronization signals and horizontal synchronization signals according to embodiments of the inventive concept.

FIG. 8A illustrates a vertical synchronization signal and a horizontal synchronization signal according to an embodiment of the inventive concept. When a description is given about FIG. 8A, and a component already described with reference to FIG. 6B is denoted by the same or similar reference numeral, a description thereof may not be given.

Referring to FIGS. 3, 5, and 8A, the controller 1000C may generate a change signal TS by detecting a change in a surface area of each of a first area and a second area. The controller 1000C may transmit the change signal TS to the display driver 100C. The change signal TS may include information about a first ratio of the first area in which an image is displayed to the active area DP-AA of the display layer 100 and a second ratio of the second area in which the image is not displayed to the active area DP-AA.

The display driver 100C may transmit, to the display layer 100, a vertical synchronization signal Vsync and a horizontal synchronization signal Hsynca generated on the basis of the change signal TS. In other words, the vertical synchronization signal Vsync and the horizontal synchronization signal Hsynca are generated in response to the change signal TS.

The horizontal synchronization signal Hsynca may include a third period AR3a synchronized with a first period AR1 of the vertical synchronization signal Vsync and a fourth period AR4a synchronized with a second period AR2 of the vertical synchronization signal Vsync.

The third period AR3a may include a first partial period P1a and a second partial period P2a which depend on the state of the change signal TS. A third ratio of the first partial period P1a to the third period AR3a may be the same as the first ratio. A fourth ratio of the second partial period P2a to the third period AR3a may be the same as the second ratio.

The horizontal synchronization signal Hsynca may include a first signal SG1a and a second signal SG2a. The first signal SG1a may be provided in the first partial period P1a. The first signal SG1a may be provided on the basis of the first area of the display layer 100. A portion of the first signal SG1a may be provided in the first partial period P1a, and the remaining portion of the first signal SG1a may be provided in the second partial period P2a. For example, the portion of the first signal SG1a in the first partial period P1a may have a high level then transition to a low level. The remaining portion of the first signal SG1a in the second partial period P2a may have the low level. The second signal SG2a may be provided on the basis of the second area. The second signal SG2a may include a signal of a high level. For example, the second signal SG2a may have a high level throughout the entirety of the second partial period P2a.

The display driver 100C may provide the vertical synchronization signal Vsync and the horizontal synchronization signal Hsynca to the sensing driver 200C. The sensing driver 200C may separate the first area from the second area on the basis of the vertical synchronization signal Vsync and the horizontal synchronization signal Hsynca. For example, the sensing driver 200C may separate the first area in which an image is displayed from the second area in which an image is not displayed, on the basis of a boundary BDa between the first partial period P1a in which the first signal SG1a is provided and the second partial period P2a. The sensing driver 200C may control the sensor layer 200 on the basis of the vertical synchronization signal Vsync and the horizontal synchronization signal Hsynca.

Figure 8B:
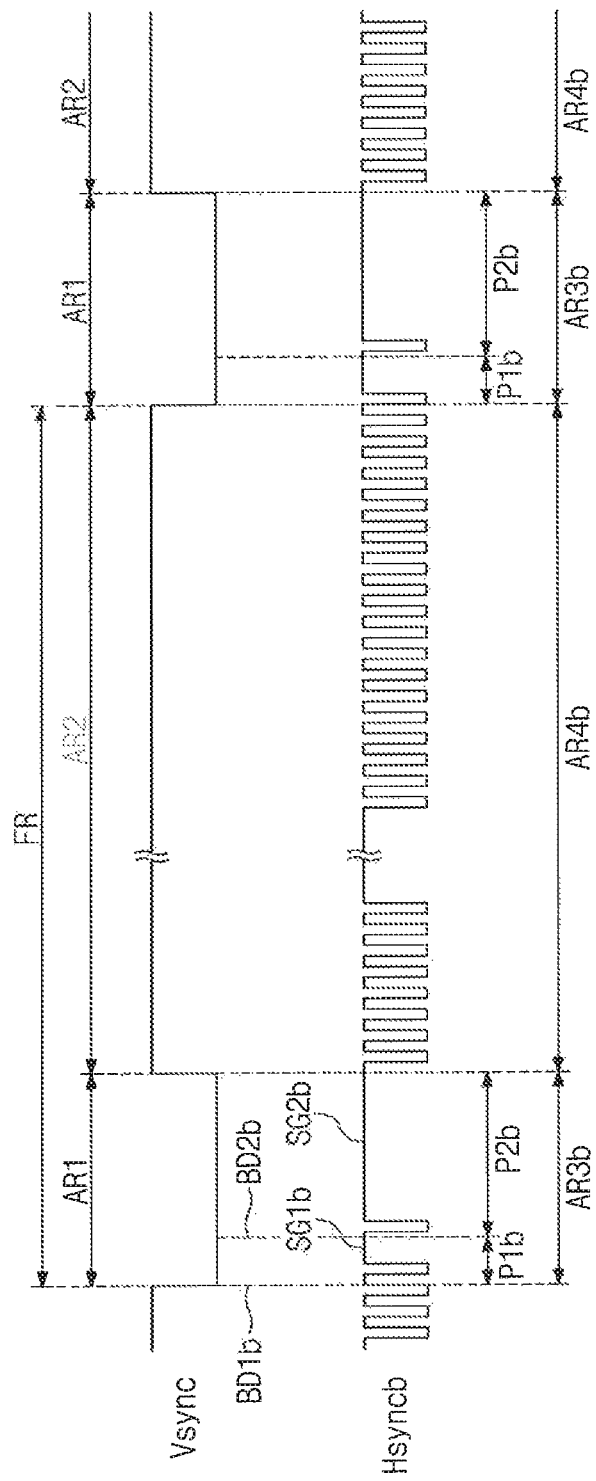

FIG. 8B illustrates a vertical synchronization signal and a horizontal synchronization signal according to an embodiment of the inventive concept. When a description is given about FIG. 8B, and a component already described with reference to FIG. 6B is denoted by the same or similar reference numeral, a description thereof may not be given.

Referring to FIGS. 3, 5, and 8B, the controller 1000C may generate a change signal TS by detecting a change of a first area and a second area. The controller 1000C may transmit the change signal TS to the display driver 100C. The change signal TS may include information about a first ratio of the first area in which an image is displayed to the active area DP-AA of the display layer 100 and a second ratio of the second area in which the image is not displayed to the active area DP-AA.

The display driver 100C may transmit, to the display layer 100, a vertical synchronization signal Vsync and a horizontal synchronization signal Hsyncb generated on the basis of the change signal TS.

The horizontal synchronization signal Hsyncb may include a third period AR3b synchronized with a first period AR1 of the vertical synchronization signal Vsync and a fourth period AR4b synchronized with a second period AR2 of the vertical synchronization signal Vsync.

The third period AR3b may include a first partial period P1b and a second partial period P2b defined on the basis of the change signal TS. A third ratio of the first partial period P1b to the third period AR3b may be the same as the first ratio. A fourth ratio of the second partial period P2b to the third period AR3b may be the same as the second ratio.

The horizontal synchronization signal Hsyncb may include a first signal SG1b and a second signal SG2b. The first signal SG1b may be provided in the first partial period P1b. The first signal SG1b may be provided on the basis of the first area of the display layer 100. The first signal SG1b may include signals that are respectively provided once after a boundary BD1b between the third period AR3b and the fourth period AR4b and once after a boundary BD2b between the first partial period P1b and the second partial period P2b. The second signal SG2b may be provided on the basis of the second area. The second signal SG2b may include a signal of a high level.

The display driver 100C may provide the vertical synchronization signal Vsync and the horizontal synchronization signal Hsyncb to the sensing driver 200C. The sensing driver 200C may separate the first area from the second area on the basis of the vertical synchronization signal Vsync and the horizontal synchronization signal Hsyncb. For example, the sensing driver 200C may identify, on the basis of the signal provided after the boundary BD1b between the third period AR3b and the fourth period AR4b, the first area where an image is provided, and may identify, on the basis of the signal provided after the boundary BD2b between the first partial period P1b and the second partial period P2b, the second area where the image is not provided. The sensing driver 200C may control the sensor layer 200 on the basis of the vertical synchronization signal Vsync and the horizontal synchronization signal Hsyncb.

Figure 9A:
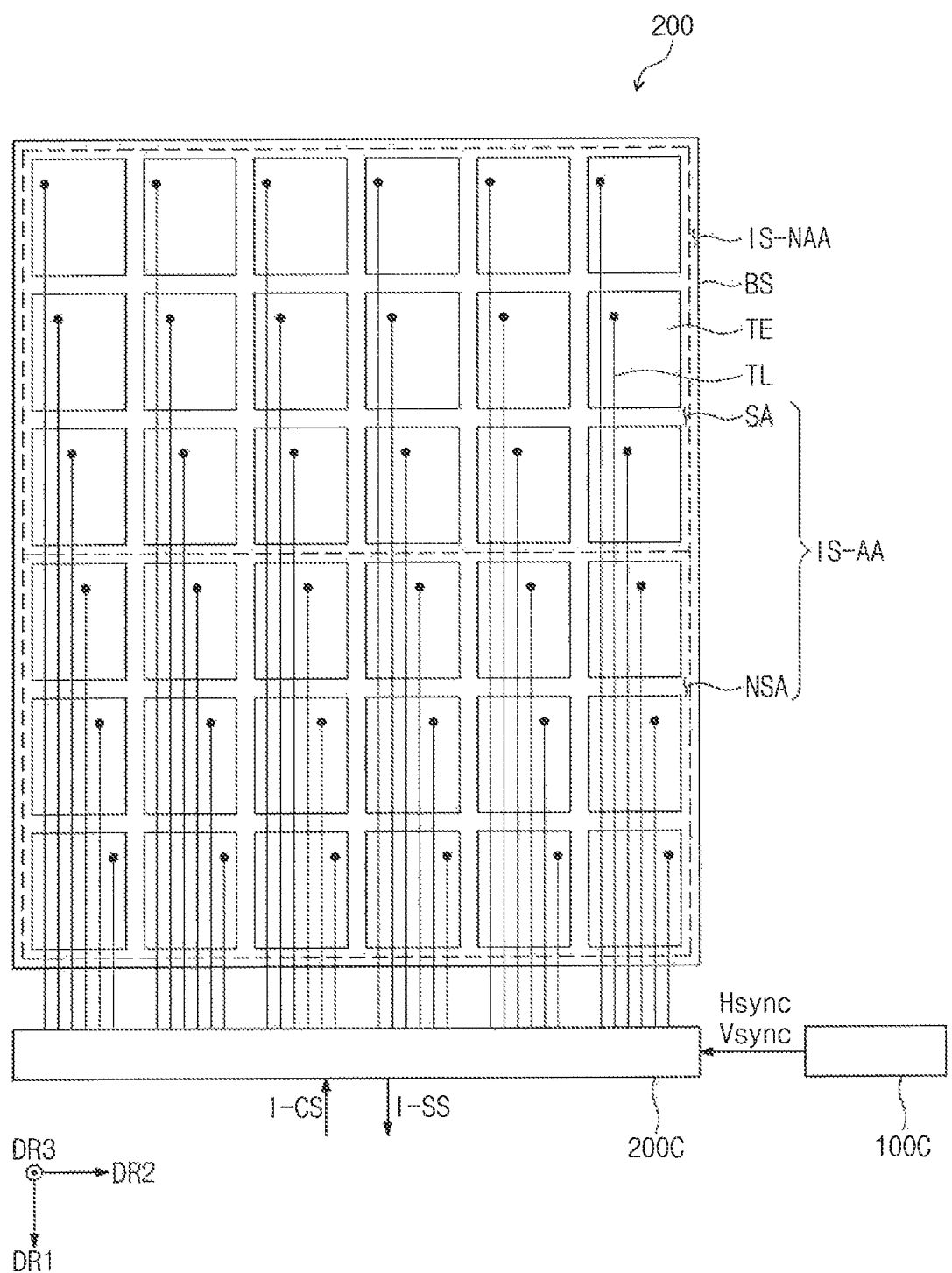
FIG. 9A and FIG. 9B illustrate sensor layers, sensing drivers, and display drivers according to embodiments of the inventive concept.

FIG. 9A illustrates a sensor layer, a sensing driver, and a display driver according to an embodiment of the inventive concept.

Referring to FIGS. 3, 6A, 6B, and 9A, an active area IS-AA and a peripheral area IS-NAA surrounding the active area IS-AA may be provided in the sensor layer 200. The active area IS-AA may be an area that is activated according to an electrical signal. For example, the active area IS-AA may be an area for sensing an input. When viewed in a plane, the active area IS-AA may overlap the active area DP-AA (see FIG. 5) of the display layer 100 (see FIG. 5), and the peripheral area IS-NAA may overlap the peripheral area DP-NAA (see FIG. 5) of the display layer 100 (see FIG. 5).

The sensor layer 200 may include a base insulating layer BS, a plurality of sensing electrodes TE, and a plurality of sensing lines TL. The plurality of sensing electrodes TE may have their own coordinate information. The plurality of sensing electrodes TE may be disposed in the active area IS-AA, a portion of each of the plurality of sensing lines TL may be disposed in the active area IS-AA, and the remaining portion of each of the plurality of sensing lines TL may be disposed in the peripheral area IS-NAA.

The base insulating layer BS may be an inorganic layer including any one of silicon nitride, silicon oxynitride, and silicon oxide. Alternatively, the base insulating layer BS may be an organic layer including epoxy resin, acrylic resin, or imide-based resin. The base insulating layer BS may be directly formed on the display layer 100 (see FIG. 3). Alternatively, the base insulating layer BS may be bonded to the display layer 100 (see FIG. 3) by an adhesive member.

The plurality of sensing electrodes TE may have their own coordinate information. For example, the plurality of sensing electrodes TE may be arranged in a matrix form. The plurality of sensing electrodes TE may be electrically connected to the plurality of sensing lines TL, respectively. The plurality of sensing electrodes TE and the plurality of sensing lines TL may be disposed in different layers. The sensor layer 200 according to an embodiment of the inventive concept may acquire coordinate information in a self-capacitance method.

FIG. 9A illustrates the plurality of sensing electrodes TE as each having a rectangular shape, but an embodiment of the inventive concept is not limited thereto. For example, each of the plurality of sensing electrodes TE may have a polygonal shape.

The plurality of sensing electrodes TE may include a conductive material. For example, the conductive material may include a metal or an alloy thereof. Examples of the metal may include gold (Au), silver (Ag), aluminum (Al), molybdenum (Mo), chromium (Cr), titanium (Ti), nickel (Ni), neodymium (Nd), copper (Cu), platinum (Pt), and the like. Each of the plurality of sensing electrodes TE may have a mesh structure. However, this is an example, and the plurality of sensing electrodes TE may be constituted of a transparent conductive material. Examples of the transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide (SnO2), carbon nano tube, graphene, and the like. The plurality of sensing electrodes TE may be formed of a single layer or multiple layers.

The sensing driver 200C may receive the control signal I-CS from the controller 1000C (see FIG. 3). The sensing driver 200C may receive the vertical synchronization signal Vsync and the horizontal synchronization signal Hsync from the display driver 100C.

The active area IS-AA may include a third area SA and a fourth area NSA. The third area SA may overlap the first area DA. The fourth area NSA may overlap the second area NDA. Although FIG. 9A illustrates a case in which the third area SA and the fourth area NSA have the same surface area, the surface area of each of the third area SA and the fourth area NSA according to an embodiment of the inventive concept is not limited thereto. The third area SA and the first area DA may have the same surface area, and the fourth area NSA and the second area NDA may have the same surface area.

The sensing driver 200C may control at least some of the plurality of sensing electrodes TE on the basis of the horizontal synchronization signal Hsync. The sensing driver 200C may drive sensing electrodes disposed in the third area SA among the plurality of sensing electrodes TE, on the basis of the first signal SG1 of the horizontal synchronization signal Hsync. The sensing driver 200C may not drive the remaining sensing electrodes among the plurality of sensing electrodes TE. In other words, the sensing driver 200C may not drive the sensing electrodes disposed in the fourth area NSA among the plurality of sensing electrodes TE, on the basis of the second signal SG2 of the horizontal synchronization signal Hsync.

The sensing driver 200C may calculate coordinate information of an external input (e.g., a user' input) on the basis of a signal received from the sensing electrodes disposed in the third area SA among the plurality of sensing electrodes TE, and may provide the controller 1000C (see FIG. 3) with the coordinate signal I-SS including the coordinate information. The controller 1000C (see FIG. 3) may allow an operation corresponding to the user's input to be executed on the basis of the coordinate signal I-SS.

According to an embodiment of the inventive concept, in the rollable electronic device 1000 (see FIG. 1A) or the foldable electronic device 1000-1 (see FIG. 2A), the controller 1000C may generate the change signal TS by detecting a change in surface areas of the first area DA and the second area NDA. The display driver 100C may generate, on the basis of the change signal TS, the vertical synchronization signal Vsync and the horizontal synchronization signal Hsync including information about the first area DA and the second area NDA. The sensing driver 200C may control the plurality of sensing electrodes TE on the basis of the vertical synchronization signal Vsync and the horizontal synchronization signal Hsync. The sensing driver 200C may drive, on the basis of the first signal SG1 of the horizontal synchronization signal Hsync, sensing electrodes overlapping the first area DA among the plurality of sensing electrodes TE. The sensing driver 200C may not drive, on the basis of the second signal SG2 of the horizontal synchronization signal Hsync, sensing electrodes overlapping the second area NDA among the plurality of sensing electrodes TE. For example, the sensing driver 200C may drive the sensing electrodes TE in an area where an image is intended to be displayed when the electronic device 1000 or 1000-1 is folded or rolled and not drive the sensing electrodes TE in an area where an image is not intended to be displayed when the electronic device 1000 or 1000-1 is folded or rolled. Accordingly, the electronic device 1000 (see FIG. 1A) may prevent a touch malfunction by not driving the sensing electrodes that overlap the second area NDA in which an image is not displayed and are disposed in the fourth area NSA in which a touch should not be sensed.

In addition, according to an embodiment of the inventive concept, the electronic device 1000 (see FIG. 1A) may not drive, on the basis of the vertical synchronization signal Vsync and the horizontal synchronization signal Hsync, the sensing electrodes that overlap the second area NDA in which an image is not displayed and are disposed in the fourth area NSA in which a touch need not be sensed. Accordingly, power consumption of the electronic device 1000 (see FIG. 1A) may be reduced.

Figure 9B:
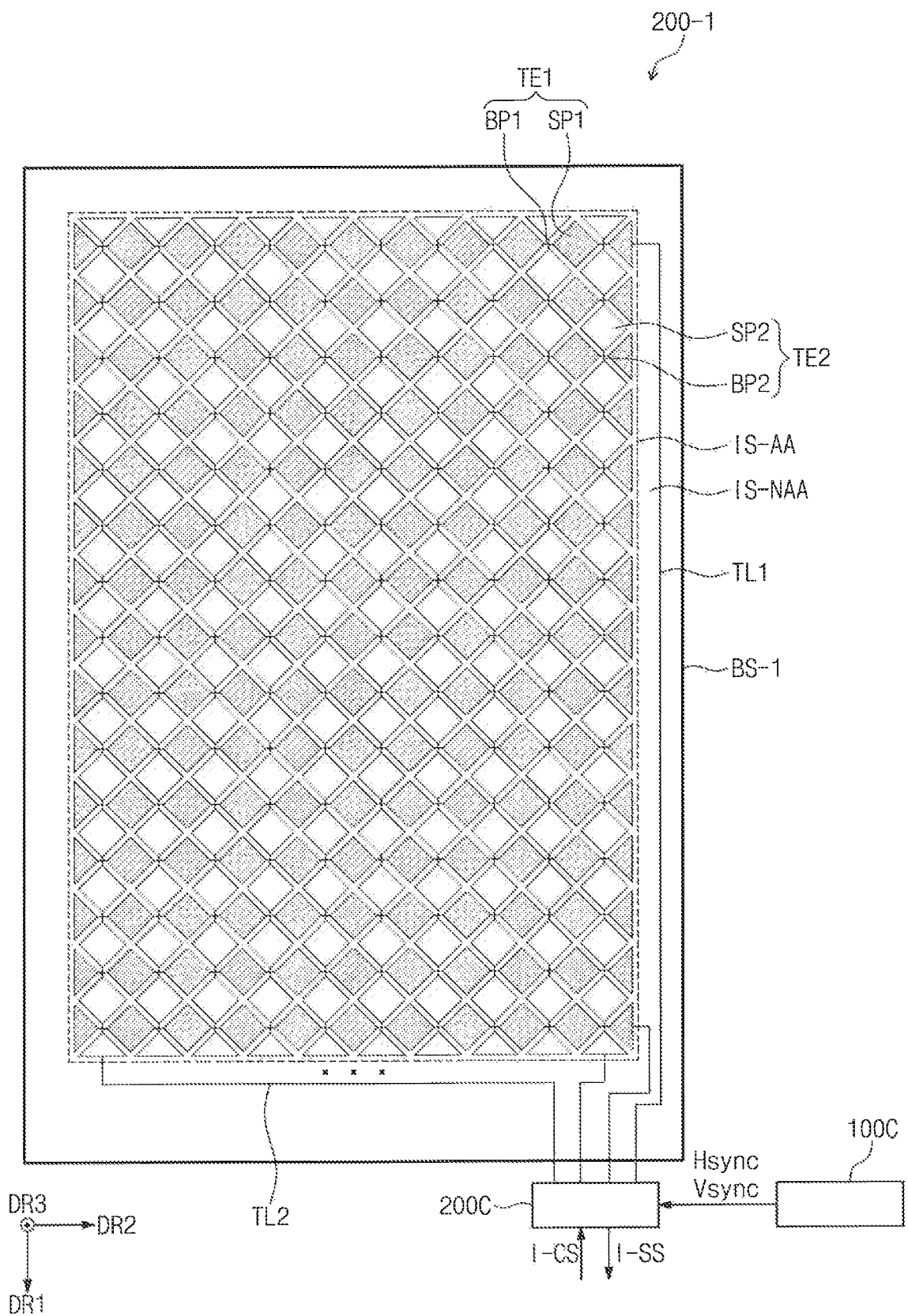

FIG. 9B illustrates a sensor layer, a sensing driver, and a display driver according to an embodiment of the inventive concept. When a description is given about FIG. 9B, and a component already described with reference to FIG. 9A is denoted by the same or similar reference numeral, a description thereof will not be given.

Referring to FIGS. 3, 6A, 6B, and 9B, an active area IS-AA and a peripheral area IS-NAA surrounding the active area IS-AA may be provided in a sensor layer 200-1.

The sensor layer 200-1 may include a base insulating layer BS-1, a plurality of first sensing electrodes TE1, a plurality of second sensing electrodes TE2, and a plurality of sensing lines TL1 and TL2. The plurality of first sensing electrodes TE1 and the plurality of second sensing electrodes TE2 may be disposed in the active area IS-AA, and the plurality of sensing lines TL1 and TL2 may be disposed in the peripheral area IS-NAA.

The sensor layer 200-1 may obtain information about an external input through a change in capacitance between the plurality of first sensing electrodes TE1 and the plurality of second sensing electrodes TE2.

The plurality of first sensing electrodes TE1 may be arranged in the first direction DR1. Each of the plurality of first sensing electrodes TE1 may extend in the second direction DR2. Each of the plurality of first sensing electrodes TE1 may include a plurality of first parts SP1 and a plurality of second parts BP1. Each of the plurality of second parts BP1 may electrically connect two first parts SP1 adjacent to each other. The plurality of first parts SP1 and the plurality of second parts BP1 may have a mesh structure.

The plurality of second sensing electrodes TE2 may be arranged in the second direction DR2. Each of the plurality of second sensing electrodes TE2 may extend in the first direction DR1. Each of the plurality of second sensing electrodes TE2 may include a plurality of sensing patterns SP2 and a plurality of bridge patterns BP2. Each of the plurality of bridge patterns BP2 may electrically connect two sensing patterns SP2 adjacent to each other. The plurality of sensing patterns SP2 may have a mesh structure.

Although, in FIG. 9B, one bridge pattern BP2 is illustrated as being connected to two sensing patterns SP2 adjacent to each other, the connection relationship between the plurality of bridge patterns BP2 and the plurality of sensing patterns SP2 according to an embodiment of the inventive concept is not limited thereto. For example, two sensing patterns SP2 adjacent to each other may also be connected to each other by two bridge patterns BP2.

The plurality of second parts BP1 may be disposed in a layer different from that of the plurality of bridge patterns BP2. The plurality of bridge patterns BP2 may cross the plurality of first sensing electrodes TE1 in an insulated manner. For example, the plurality of second parts BP1 may respectively cross the plurality of bridge patterns BP2 in an insulated manner.

The plurality of sensing lines TL1 and TL2 may include a plurality of first sensing lines TL1 and a plurality of second sensing lines TL2. The plurality of first sensing lines TL1 may be electrically connected to the plurality of first sensing electrodes TE1, respectively. The plurality of second sensing lines TL2 may be electrically connected to the plurality of second sensing electrodes TE2, respectively.

The sensing driver 200C may receive the control signal J-CS from the controller 1000C (see FIG. 3). The sensing driver 200C may receive the vertical synchronization signal Vsync and the horizontal synchronization signal Hsync from the display driver 100C.

The sensing driver 200C may control at least some of the plurality of sensing electrodes TE on the basis of the horizontal synchronization signal Hsync. The sensing driver 200C may drive sensing electrodes TE overlapping the first area DA on the basis of the first signal SG1 of the horizontal synchronization signal Hsync. The sensing driver 200C may not drive sensing electrodes TE overlapping the second area NDA on the basis of the second signal SG2 of the horizontal synchronization signal Hsync.

The sensing driver 200C may calculate coordinate information of an external input (e.g., a user' input) on the basis of a signal received from the sensing electrodes TE disposed in the third area SA, and may provide the controller 1000C (see FIG. 3) with the coordinate signal I-SS including the coordinate information. The controller 1000C (see FIG. 3) may allow an operation corresponding to the user's input to be executed on the basis of the coordinate signal l-SS.

According to an embodiment of the inventive concept, in the rollable electronic device 1000 (see FIG. 1A) or the foldable electronic device 1000-1 (see FIG. 2A), the controller 1000C may generate a change signal TS by detecting a change in surface areas of a first area DA and a second area NDA. A display driver 100C may generate, on the basis of the change signal TS, a vertical synchronization signal Vsync and a horizontal synchronization signal Hsync including information about the first area DA and the second area NDA. The sensing driver 200C may control the plurality of first sensing electrodes TE1 and/or the plurality of second sensing electrodes TE2 on the basis of the vertical synchronization signal Vsync and the horizontal synchronization signal Hsync. On the basis of a first signal SG1 of the horizontal synchronization signal Hsync, the sensing driver 200C may drive sensing electrodes overlapping the first area DA among the plurality of first sensing electrodes TE and/or the plurality of second sensing electrodes TE2. On the basis of a second signal SG2 of the horizontal synchronization signal Hsync, the sensing driver 200C may not drive sensing electrodes overlapping the second area NDA among the plurality of first sensing electrodes TE1 and/or the plurality of second sensing electrodes TE2. Accordingly, the electronic device 1000 (see FIG. 1A) may prevent a touch malfunction by not driving the sensing electrodes that overlap the second area NDA where an image is not displayed and are disposed in an area where a touch should not be sensed.

According to an embodiment of the inventive concept, in addition, the electronic device 1000 (see FIG. 1A) may not drive, on the basis of the vertical synchronization signal Vsync and the horizontal synchronization signal Hsync, the sensing electrodes that overlap the second area NDA where an image is not displayed and are disposed in an area where a touch need not be sensed. Accordingly, power consumption of the electronic device 1000 (see FIG. 1A) may be reduced.

In the electronic device, according to an embodiment of the inventive concept, the controller may generate the change signal by detecting a change in the surface areas of the first area where an image is displayed and the second area where no image is displayed. In other words, the change signal may identify the first and second areas. The display driver may generate, on the basis of the change signal, the vertical synchronization signal and the horizontal synchronization signal including information about the first area and the second area. The sensing driver may control the plurality of sensing electrodes on the basis of the vertical synchronization signal and the horizontal synchronization signal. The sensing driver may drive sensing electrodes overlapping the first area among the plurality of sensing electrodes on the basis of the horizontal synchronization signal. The sensing driver may not drive sensing electrodes overlapping the second area among the plurality of sensing electrodes on the basis of the horizontal synchronization signal. Accordingly, the electronic device may prevent a touch malfunction by not driving the sensing electrodes that overlap the second area where no image is displayed and are disposed in an area where a touch should not be sensed. For example, when an electronic device is in a folded state, contact to display surfaces where no image is displayed will not result in a sensing, since the sensing electrodes in such areas are displayed.

In addition, according to an embodiment of the inventive concept, the electronic device may not drive, on the basis of the vertical synchronization signal and the horizontal synchronization signal, the sensing electrodes that overlap the second area where no image is displayed and are disposed in an area where a touch need not be sensed. Accordingly, power consumption of the electronic device may be reduced.

Although the embodiments of the inventive concept have been described herein, it is understood that various changes and modifications can be made by those skilled in the art within the scope of the inventive concept as set forth by the following claims or the equivalents.

What is claimed is:

1. An electronic device, comprising:
    a display layer including an active area and a peripheral area adjacent to the active area, wherein the active area includes a first area in which an image is displayed;
    a sensor layer disposed on the display layer and including a plurality of sensing electrodes;
    a controller configured to generate a change signal in response to a change in a surface area of the first area;
    a display driver configured to transmit a horizontal synchronization signal to the display layer in response to the change signal; and
    a sensing driver configured to control at least some of the plurality of sensing electrodes in response to the horizontal synchronization signal.

2. The electronic device of claim 1, wherein the active area further comprises, due to a change of the display layer, a second area in which the image is not displayed,
    wherein the sensing driver drives sensing electrodes overlapping the first area among the plurality of sensing electrodes and does not drive sensing electrodes overlapping the second area among the plurality of sensing electrodes.

3. The electronic device of claim 2, wherein the change signal comprises information about a first ratio of the first area to the active area and a second ratio of the second area to the active area.

4. The electronic device of claim 3, wherein the display driver further transmits a vertical synchronization signal to the display layer,
    wherein the vertical synchronization signal comprises a first period in which a signal of a low level is provided and a second period in which a signal of a high level is provided, and
    the horizontal synchronization signal comprises a third period synchronized with the first period and a fourth period synchronized with the second period.

5. The electronic device of claim 4, wherein
    the third period comprises a first partial period and a second partial period,
    the horizontal synchronization signal comprises a first signal and a second signal, and
    the first signal is provided in the first partial period, and the second signal is provided in the second partial period.

6. The electronic device of claim 5, wherein the second partial period occurs subsequent to the first partial period.

7. The electronic device of claim 5, wherein the sensing driver drives some of the plurality of sensing electrodes in response to the first signal and does not drive the rest of the plurality of sensing electrodes in response to the second signal.

8. The electronic device of claim 5, wherein
    a third ratio of the first partial period to the third period is the same as the first ratio, and
    a fourth ratio of the second partial period to the third period is the same as the second ratio.

9. The electronic device of claim 5, wherein the first signal is provided on the basis of the first ratio, and the second signal is provided on the basis of the second ratio.

10. The electronic device of claim 5, wherein the first signal comprises a repeating square wave.

11. The electronic device of claim 5, wherein a first portion of the first signal is provided in the first partial period, and a second portion of the first signal is provided in the second partial period.

12. The electronic device of claim 5, wherein the first signal comprises a signal of a first level that is provided once after a boundary between the third period and the fourth period and once after a boundary between the first partial period and the second partial period.

13. The electronic device of claim 2, wherein
    the display layer is rollable,
    the first area comprises an unrolled area, and
    the second area comprises a rolled area.

14. The electronic device of claim 2, wherein
    the display layer is foldable,
    the first area comprises an area exposed to the outside, and
    the second area comprises an area not exposed to the outside.

15. An electronic device, comprising:
    a display layer including an active area, wherein the active area includes a first area in which an image is displayed;
    a sensor layer disposed on the display layer and including a plurality of sensing electrodes;
    a controller configured to detect a change in a surface area of the display layer and generate a change signal including information about the surface area of the first area;
    a display driver configured to generate a vertical synchronization signal and generate a horizontal synchronization signal in response to the change signal; and a sensing driver configured, in response to the horizontal synchronization signal, to drive sensing electrodes overlapping the first area among the plurality of sensing electrodes and not to drive the remaining sensing electrodes among the plurality of sensing electrodes.

16. The electronic device of claim 15, wherein the display layer further comprises a second area in which the image is not displayed,
wherein the information comprises information about a first ratio of the first area to the active area and a second ratio of the second area to the active area.

17. The electronic device of claim 16, wherein
the vertical synchronization signal comprises a first period in which a signal of a low level is provided and a second period in which a signal of a high level is provided, and
the horizontal synchronization signal comprises a third period synchronized with the first period and a fourth period synchronized with the second period.

18. The electronic device of claim 17, wherein
the third period comprises a first partial period and a second partial period, and
a first signal is provided in the first partial period, and a second signal is provided in the second partial period.

19. The electronic device of claim 18, wherein
a ratio of the first partial period to the third period is the same as the first ratio, and
a ratio of the second partial period to the third period is the same as the second ratio.

20. The electronic device of claim 18, wherein the first signal is provided on the basis of the first ratio, and the second signal is provided on the basis of the second ratio.

* * * * *